Jan. 13, 1970 T. E. SALZER 3,489,879

THERMOSWAGING METHOD FOR FIXING PINS TO CERAMIC WAFERS

Filed Feb. 9, 1967

INVENTOR
Thomas E. Salzer
BY Jack Larsen
ATTORNEY 3,489,879
THERMOSWAGING METHOD FOR FIXING PINS TO CERAMIC WAFERS Thomas E. Salzer, Bedford, Mass., assignor to Microtek Electronics Inc., a corporation of Massachusetts Filed Feb. 9, 1967, Ser. No. 615,009
Int. Cl. B21j 5/08
U.S. Cl. 219—152 9 Claims

ABSTRACT OF THE DISCLOSURE

Fixing terminal pins to holes in ceramic hybrid-circuit substrates is effected by hot upsetting, using a spot-welding machine to provide heat, pressure, and rapid cooling as required by the process. Softened by passing a pulse of current through it, a pin is expanded to fit and headed to grip its hole in the substrate, and the surface film of metal through which electrical connection is made to other circuit elements. The pins are heated into a condition of plastic flow short of fusion whereby breakage is avoided and between compatible metals a thermocompression bond results between pin and film and at the same time good initial contact is maintained by residual tension in the pin. Tension remains because the ends of the pin are cooled from the plastic state before the portion within the hole by reason of contact with massive metal contact and forming jaws.

This invention relates to metal-ceramic technology and more particularly to a method for fixing terminal pins to hybrid circuits having ceramic substrates.

It has been found heretofore that rigid metal pins fixed to circuit substrates provide a practical means for electrical connections to such circuits. Usually it is desired that these pins stand up perpendicular to a flat substrate; and for a firm anchorage to the substrate are staked or riveted to the ceramic substrate.

This practice has been carried over from the printed-circuit art wherein pins and eyelets are riveted to plastic composition circuit boards.

It has been found that in carrying out the old assembly processes with the new substrates the riveting or staking operation too often cracks the substrate. This is disastrous since the attachment of the pins is one of the last operations in the fabrication of valuable hybrid circuits using the so-called thick-film processes. Conducting films in the thick-film technology are "thick" only in comparison to the films in "thin-film" technology which may be evaporated onto the substrate in vacuum with a thickness which may be only a few atoms deep but may be built up to as much as 0.002 inch. In contrast, thick-film technology employs printed and fired-on resistor and conductor patterns typically printed with a thickness of one mil, resulting in a fired thickness somewhat less. Thus it will be seen that some "thin" films may be thicker than some "thick" films. In either case they are so thin as to require the substrate for mechanical support.

It is an object of the present invention to affix pins to ceramic circuit substrate without breakage; and it is a further object of the invention to achieve by the new process, attachments which electrically and mechanically equal or surpass connections made in accordance with the prior art.

The feature of the invention by which these objects are attained is the application of a measured impulse of heat to the base stub of the pin to lower its yield point, coordinated with the application of pressure to upset and head the stub and the rapid and relatively uniform cooling of the upset portion.

Other objects of the invention will in part be obvious and will in part appear hereinafter.

The invention accordingly comprises the several steps and relation of one or more of such steps with respect to each of the others thereof, which will be exemplified in the method hereinafter disclosed, and the scope of the invention will be indicated in the claims.

For a fuller understanding of the nature and objects of the invention reference should be had to the following detailed description taken in connection with the accompanying drawings, in which.

Figure 1:
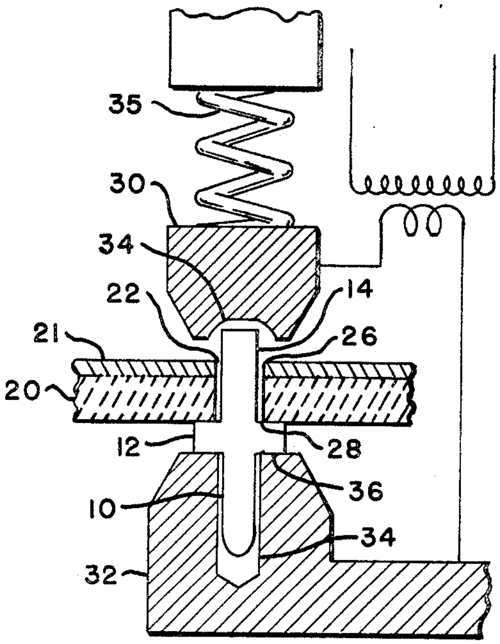
FIG. 1 is a schematic diagram of apparatus.

As shown schematically and partially in section in FIG. 1 a pin 10 having a shoulder 12 and a stub 14 is fastened to a circuit body comprising a substrate 20 and metal film 21 by pressing it into hole 22 in the substrate and thereafter pressing it between jaws 30 and 32 which are at once the means of heating the pin 10 and heat sinks for rapidly cooling it. A good mechanical connection is thereby made to the substrate and a good electrical connection between the so-upset stub 14 and the hole bordering region of the film 21, as explained below.

The lower jaw has a cavity 34 which loosely accommodates the pin 10, while closely surrounding the shoulder 12 so that a face 36 is brought into intimate contact with the shoulder 12. The shoulder is proportioned to bear the load and so that the resistance to the flow of heat and electricity between the jaw 32 and the stub 14 is localized mainly in the stub. The upper jaw 30 rests smoothly on the end of the stub 14 to provide a second good thermal and electrical contact.

In operation, the pin 10 is dropped into the cavity 34; the substrate 20 is placed so that the region bordering the hole 22 presses the top surface of the shoulder 12 and the stub 14 passes snugly through the hole 22 prepared in the substrate. The stub 14, then, has an inner portion within the hole 22 and an end part extending beyond the hole. The upper jaw 30 is then lowered against the end of the stub 14 pressed by a spring 35 to a predetermined force level which compresses the stub within its elastic limit at the room temperature. The required pressure for copper is about 20,000 pounds per square inch, cooresponding to 6 pounds force on a typical 0.02" diameter stub.

Figure 2:
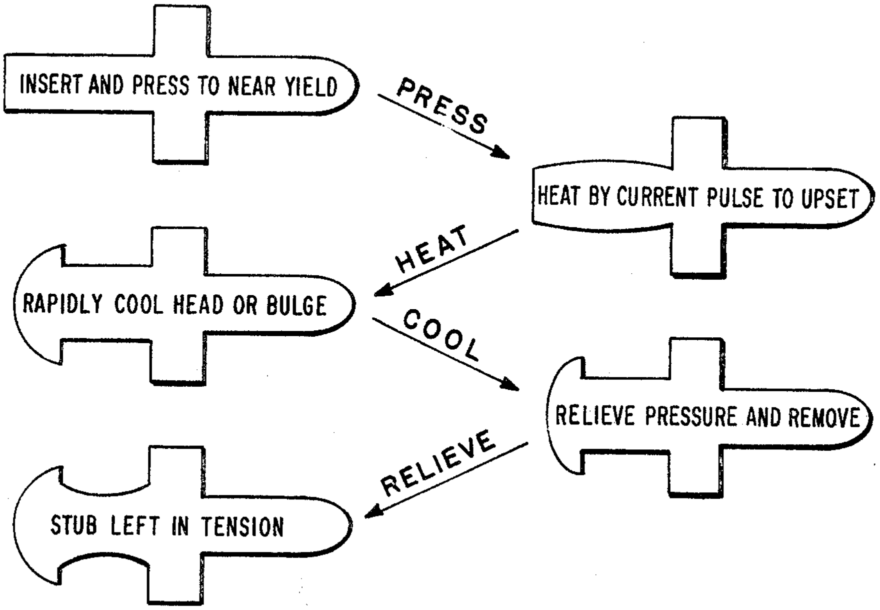
FIG. 2 is a flow diagram of the process.

This pressure is sufficient to insure good electrical contact. The steps of the process are indicated in the flow chart of FIG. 2, wherein the shape of the blocks indicates the shape of the stub at the *beginning* of the step.

Under pressure of the jaws, the stub is warmed by passing a predetermined pulse of current between the jaws. The nature of this pulse is similar to the pulse required for electrical resistance spot-welding; and both the pressure and the current pulse may be supplied by modified welding equipment.

The intensity of the pulse is selected to be less than that required for complete fusion. It is sufficient to lower the yield point below the level of applied pressure and to provide a sufficient rate of plastic flow that the stub quickly expands to fill the hole 22, and the top of the stub upsets to form a head. The same current pulse flows through both the stub 14 and the shoulder 12. The energy J dissipated in a short length $dl$ of conductor of resistivity $p$ and radius $r$ by a current of I amperes flowing for $t$ seconds is given by the equation:

$$J=I^2pt(dl)/\pi r^2 \qquad (1)$$

and the amount of energy per unit volume U is given by $$U=J/\pi r^2(dl)=I^2pt/\pi^2r^4 \qquad (2)$$

Thus it is seen that the energy injected per unit volume is proportional to the resistivity and inversely proportional to the fourth power of the radius. The adiabatic temperature rise is proportional to the energy input, assuming the specific heat to be constant over the temperature range, which is a good assumption for most metals. To support the pre-load, the bearing area of the shoulder 12 against the jaw 32 must equal or exceed the area of the stub 14 in contact with the jaw 34, the total area of the shoulder must be at least twice that of the stub, and, therefore the temperature rise where the shoulder contacts the substrate is only one-fourth or less of the temperature rise experienced in the stub. As is well known, current in a continuous medium such as the pin, flows along stream lines which are smooth curves, so that, at a sharp corner such as the intersection of the shoulder and the stub, the lines curve smoothly to maintain continuity between the closely spaced imaginary lines in the stub, and the more widely spaced lines in the shoulder. Accordingly current density and heat injection is not uniform. To the extent that the head forms before the current pulse ceases, there will be a spreading of the stream lines along with the spreading of the head. It will be noted that the current flowing between the jaws tends to concentrate in the metal where it turns the corners 26 and 28 at the top and bottom respectively of the hole 22. Since it is where the sharp corners 26 and 28 of the ceramic press against the metal that fracture of the ceramic would be expected to start it is propitious that the corners should bear against the softest parts of the stub.

The jaws also are the means of cooling the deformed stub to fix the pin permanently in place.

The heat imparted by the current pulse is rapidly carried away into the heat sinks provided by the jaws 30 and 32. The shoulder 12 and the head are the first to cool, forming strong bridges across both ends of the hole 22.

As the stub cools its volume contracts, but, after stiffening of the ends, this contraction is compelled to be predominantly radial rather than longitudinal. As a result, the pressure outward against the cylindrical wall of the hole 22 is substantially reduced or eliminated altogether. At the same time, the longitudinal compression imposed by the jaws 30 and 32 is shifted outward from the forshortened core of the stub to pass instead through the head and the shoulder to the relatively non-shrinking ceramic substrate and the stress in the core shifts to tension. This tension remains and increases when the jaws are separated and thereafter it tends to maintain good contact between the head and the metal film 21 through which electrical connection is made to the other circuit elements (not shown). It will be recognized that the mild heat and plastic flow in the pin while being maintained in intimate contact with the film 21 are factors which tend to promote cold welding, or a diffusion bond, between the pin 10 and the metal film 21, thus such a band results provided only that the metals are compatible. A film 21 of silver-palladium and a pin 10 of copper are compatible. Therefore, a good "thermo-compression bond" is formed between pin and film which actually may improve with age because the development and improvement of the diffusion bond between the pin and film counteracts any slight relaxation over a period of time in the residual tension in the core of the stub by which the substrate is gripped between head and shoulder of the pin.

In practice the correct heat, pressure, and pin dimensions are quickly and easily found by trial and error.

Starting with the desired properties of the pins and a specified strength of attachment a hole diameter is selected. An ultimate value for the gripping tension in the stub may then be approximated. This force and the thickness of substrate result in a preliminary figure for the working areas of head and shoulder, and define the strength and thermal expansion values which, in turn suggest the choice of pin material.

Then the required forming pressure at the maximum permissible temperature is checked and compared with the hydrostatic bursting pressure of the hole 22. If the comparison is favorable, the optimum pressure and temperature are found by experiment. If the hot strength and proportions of the selected pin and material are found to be incompatible, redesign is necessary starting with modified pin dimensions and composition.

Thus, one may start with an approximately ideal design for specified leads, then look for pins which are inexpensive and available and might do, with, perhaps, cutting off the stub to a predetermined length. The present process maximizes the probability that what is available will do.

As an example, which I deem the preferred embodiment of the invention, a pin of half-hard electrolytic tough pitch copper, 0.02" diameter with a stub length of of 0.092" with shoulder 0.035" diameter and 0.015" thick is attached to a substrate of aluminum oxide ceramic 0.06" thick, with holes 0.022" diameter. Film conductors on the substrate are of palladium silver and their thickness is about .001" thick.

Attachment is made by applying five to eight pounds force with a Raytheon, model 60–C Welder with model ILS head. The shaped jaws are of copper tungsten alloy.

The voltage measure between jaws is about 1 volt and pulse duration is about 4 milliseconds. The energy delivered with each pulse is about one-half calorie which is about the energy required to fuse the stub portion. Some of this energy goes immediately into the jaws; but a negligible amount is conducted away during the pulse. It is known that the pin is not fused under these conditions.

Metallurgical sections through such a connection, after cooling show complete filling of the hole and intimate conformity of metal to ceramic, but no evidence of fusion in an optimum connection. It is believed, therefore, that the peak temperature reached is only slightly below the fusion temperature of 1083° C.

In a modification of the apparatus and method, the lower jaw is a collet fed by a continuous length of wire. The collet grips the wire, the substrate is spaced from both jaws and when the pulse and pressure are applied both head and shoulder are upset in one step. Then the attached substrate is raised to withdraw a new length of wire and the pin is cut to length. In a still further modification the pin is pre-headed and attachment is by upsetting a shoulder. If one defines a bulge as either a head or a shoulder, and bulging as the formation of a head or a shoulder, then the process generically results in a solid metal part which passes through the substrate gripping the substrate between two bulges at least one of which is formed by hot upsetting a pin in the process.

It will thus be seen that the objects set forth above, among those made apparent from the preceding discription, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The embodiments of the invention in which an exclusive property or privilege is claimed are defined as follows:

1. The method of fixing a contact pin of metal to a circuit body comprising a substrate of ceramic perforated by a hole encircling said pin and a metal film deposited on a side of said substrate in a region bordering said hole comprising the steps of (a) applying longitudinal pressure to a working length of said pin to a stress level closely approaching its yield point by application of electrode means to an end of said working length, said length having an inner portion within, and having a part extending beyond said hole on said side, (b) passing electrical current through said length to heat said length substantially adiabatically and uniformly over its length to soften said length.

(c) upsetting said length by continued application of substantially said pressure to fill said hole and to form a bulge in said part in intimate contact with said film in said region, (d) rapidly cooling said bulge, and (e) releasing said pressure to leave tension stresses in the metal filling said hole.

2. The method of claim 1 wherein said bulge is a head.

3. The method of claim 1 wherein said bulge is a shoulder.

4. The method of claim 1 wherein said cooling step is effected by holding said bulge in intimate contact with a massive metallic jaw.

5. The method of claim 4 wherein said heating step is effected by passing a pulse of electric current from said jaw through said length.

6. A method of attaching a pin to a hybrid circuit body comprising a ceramic substrate and a metallic film applied to a side thereof, both perforated by a hole encircling said pin, comprising the steps of (a) situating said pin so that a working length thereof having a substantially uniform cross-sectional area has a portion within said hole and a part extending beyond said hole on said side, (b) applying a force to said length along the longitudinal axis thereof to stress said length throughout to a level closely approaching its yield point, (c) heating said length uniformly to a temperature below the fusion point of said pin by passing a pulse of electric current through said length, for a short heating time, to soften said length, (d) upsetting said length by continued application of substantially said pressure for an upsetting time to fill said hole and to form a bulge in said part in intimate contact with said film, (e) while continuing the application of said force, rapidly cooling said bulge in a cooling time, and thereafter (f) releasing said pressure to leave tension stresses in said region, said force, said temperature, said times, and the choice of metals for said pin and said film being coordinated to effect a thermocompression bond between said bulge and said film.

7. The process as defined by claim 6 wherein said heating time is less than twenty milliseconds, said upsetting time is more than twenty milliseconds, and the total of said upsetting time and said cooling time is more than one fifth of a second.

8. The process as defined by claim 6 wherein said film comprises principally silver, and said pin comprises principally copper.

9. The process as defined by claim 6 wherein said temperature is approximately 1000 degree centigrade.

References Cited

UNITED STATES PATENTS

| | | | |
|---|---|---|---|
| Re. 15,364 | 5/1922 | Rypinski | 219—150.5 |
| 1,451,894 | 4/1923 | Rypinski | 219—150.5 |
| 3,281,923 | 11/1966 | Best et al. | 29—470.5 |
| 3,275,793 | 9/1966 | Frischkorn et al. | 219—94 |

JOSEPH V. TRUHE, Primary Examiner

B. A. STEIN, Assistant Examiner

U.S. Cl. X.R.

29—622, 626, 628, 630; 219—150.5